Oct. 15, 1935.   K. E. PEILER   2,017,569
APPARATUS FOR SHAPING GLASSWARE
Filed July 9, 1929   3 Sheets-Sheet 1
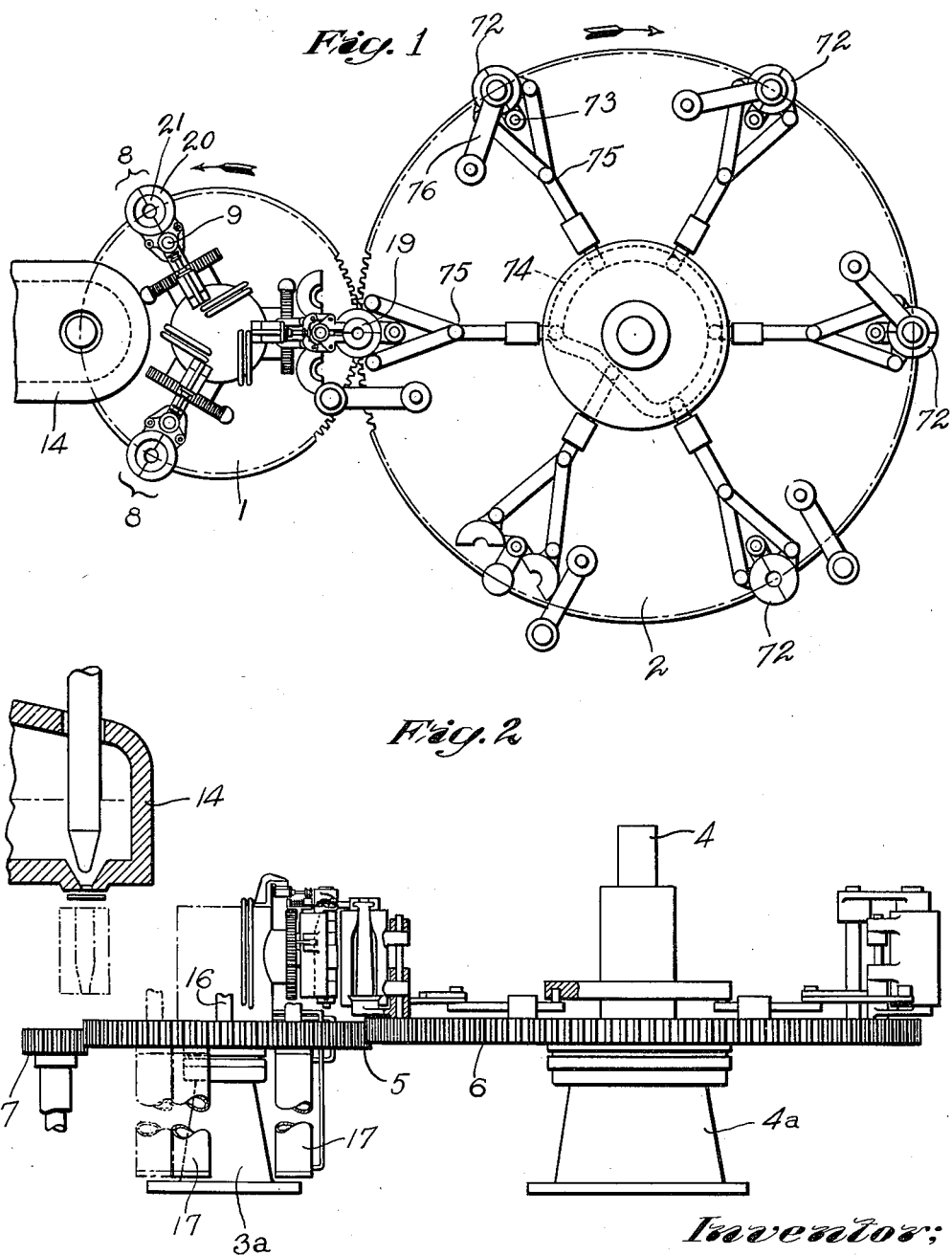

Oct. 15, 1935.                K. E. PEILER                2,017,569
                       APPARATUS FOR SHAPING GLASSWARE
                       Filed July 9, 1929           3 Sheets-Sheet 2

Witness;
W. B. Thayer.

Inventor;
Karl E. Peiler,
by Brown + Parham
Attorneys

Oct. 15, 1935. K. E. PEILER 2,017,569
APPARATUS FOR SHAPING GLASSWARE
Filed July 9, 1929 3 Sheets-Sheet 3
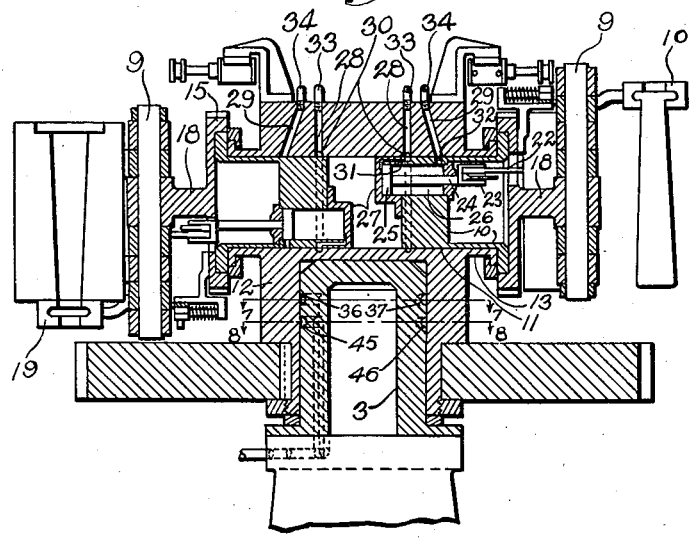
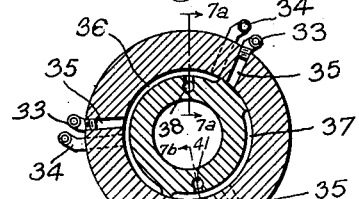
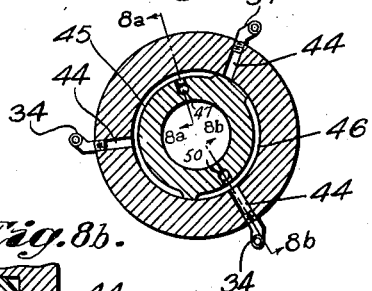
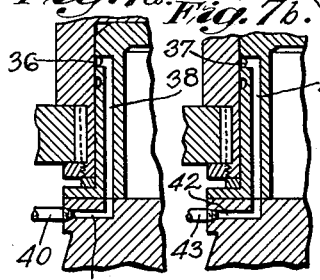
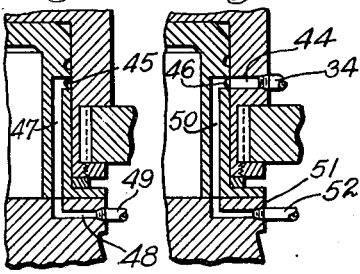
Inventor;
Karl E. Peiler;
by Brown & Parham
Attorneys
Witness
W. B. Thayer Patented Oct. 15, 1935

2,017,569

UNITED STATES PATENT OFFICE 2,017,569

APPARATUS FOR SHAPING GLASSWARE

Karl E. Peiler, West Hartford, Conn., assignor to Hartford-Empire Company, Hartford, Conn., a corporation of Delaware Application July 9, 1929, Serial No. 376,895

1 Claim. (Cl. 49—9)

This invention relates to apparatus for fabricating glassware and has particular relation to the operation of transferring parisons from the blank molds to the blow molds of glass shaping machines.

This application illustrates and describes only subject matter illustrated and described in my copending application, Serial No. 87,800, filed Feb. 12, 1926. It differs from that application primarily only in the addition of written matter and illustrative drawings showing details which, in the prior application, were described by reference to the Lynch British Patent No. 160,366.

One object of my invention is to provide a machine for forming glassware wherein the blank mold table and the blow mold table are continuously rotated side-by-side with the molds of the two tables at approximately the same level, and wherein the blanks are transferred from the blank molds to the blow molds without the use of tongs or other special transfer mechanism.

Another object of the present invention is to provide a novel continuously rotating two-table glassware forming machine, wherein means is provided for automatically opening the body parison mold, leaving the previously formed blank or parison suspended from the neck ring, the parison then being carried by the neck ring into a position to be inclosed by a previously opened finishing mold, and the neck ring being subsequently automatically opened after the inclosure of the blank by the finishing mold, all of these operations occurring during the continuous rotation of the blank mold and finishing mold tables. For the accomplishment of this object, suitable mechanism may be provided for opening the body parison mold and the neck mold at appropriate times to effect the transfer of a blank as above described, and for thereafter closing the body parison mold and the neck mold to permit another blank to be formed therein.

Other objects will appear from the following description and the appended claim.

It has long been recognized that it is advantageous to rotate the mold tables of glassware machines continuously instead of intermittently, since the continuously rotating tables may be rotated by simple table turning mechanism, and since the continuous rotation avoids the shock incident to the repeated starting and stopping of the tables. It has heretofore been considered necessary, in continuous machines operating on the blank or parison system, either to superpose the blank mold table and the blow mold table, thereby complicating the structure of the machine; or, when the continuously rotating tables have been placed side by side, as is preferable, then it has been thought necessary to employ swinging tongs, or other special transfer mechanism, for the purpose of transferring parisons from the blank mold to the blow mold.

According to my present invention, I obtain all the advantages of continuously rotating mold tables, while at the same time avoiding the use of such special transfer mechanism, by so associating the blank mold table and the blow mold table as to rotate the blank mold and the blow mold in circular paths which are substantially tangent at one point, and by transferring the parison at or near this point of tangency by opening each blank mold, leaving the blank suspended by the blank mold neck ring, and closing around the suspended blank the blow mold which at that time is brought into proper position for this purpose, after which the neck ring is opened to release the blank and permit it to be carried forward by the blow mold. All of these operations take place without stopping the continuous rotation of the mold table, and no transfer mechanism is employed in addition to the mold elements.

In the accompanying drawings:

Figure 1 is a diagrammatic plan view of a glass shaping machine embodying the invention;

Fig. 2 is a view in side elevation of the structure shown in Fig. 1, certain parts being broken away for clearness;

Fig. 3 is a view in top plan on enlarged scale of the blank mold table, showing the various parts of the machine in the positions which they occupy at the time that a blank is about to be transferred to the cooperative finishing mold;

Fig. 4 is a view in side elevation of a fragmentary portion of the blank mold table shown in Fig. 3;

Fig. 5 is a view in cross sectional elevation taken on the line 5—5 of Fig. 4 and showing the pressure actuated mechanism for operating one of the body molds;

Fig. 6 is a view in vertical transverse sectional elevation taken on the line 6—6 of Fig. 3 and showing certain of the fluid pressure passages communicating with the body mold operating means;

Fig. 7 is a view in cross section, taken on the line 7—7 of Fig. 6, showing a portion of the valve structure which controls the operation of the body mold opening and closing mechanism;

Figs. 7a and 7b are views in vertical transverse section of fragmentary portions of the valve structure taken respectively along the lines 7a—7a and 7b—7b of Fig. 7;

Fig. 8 is a view similar to Fig. 7, but taken on the line 8—8 of Fig. 6; and

Figs. 8a and 8b are views similar to those shown in Figs. 7a and 7b but taken respectively on lines 8a—8a and 8b—8b of Fig. 8.

Referring to the drawings, a glass shaping machine embodying the invention is illustrated as comprising a blank mold table 1 and a blow mold table 2, mounted for rotation about vertical shafts or columns 3 (Fig. 6) and 4, which respectively form parts of pedestals 3a and 4a. The tables 1 and 2 are respectively provided with intermeshing peripheral gears 5 and 6 and are driven in unison by a pinion 7 which meshes with the gear 5. By means of this construction, the mold tables may be rotated in opposite directions, for example, as shown by the arrows in Fig. 1, the cooperative blank and finishing molds moving in the same direction in the transfer zone.

The blank mold table 1 is adapted to carry several blank molds 8, hereinafter more fully described, and which can be of any number desired. In the present instance, three of these blank molds have been shown in connection with the table 1, and during one complete rotation of the blank mold table, each of the blank molds receives a charge of glass at the glass charging station, and carries the charge, while it is being formed therein into a parison by suitable means (not shown), toward the transfer station between the blank mold table and the blow mold table. All of the blank molds may be of the same construction, and they all may operate successively in the same manner so that in describing the construction and operation of one mold it is to be understood that the same description applies to all the molds on the blank mold table.

Each blank mold unit is supported for rotation about a horizontal axis by means of a tubular stub-shaft 10, (Figs. 5 and 6) mounted in a bearing 11. The bearing 11 is formed, in part, in the upwardly extending cap portion of the hub 12 of the table and, in part, in a tubular extension 13 provided on the hub 12. The hub and the cap portion thereof surround and inclose the top portion of the pedestal or column 3, previously referred to, as is clearly shown in Fig. 6.

The blank mold units 8 are rotated in the bearings 11 in order to present them in a neck-down position beneath the outlet of a glass feeding device 14 and in an upright position at the transfer station, by means of gears 15 which are fixed to the outer ends of the stub-shafts 10, and which are rotated through the medium of intermeshing vertical rack bars 16 (Figs. 2, 3 and 4). These rack bars extend upwardly through openings in the table and are connected at their lower ends to pistons in cylinders 17. The cylinders 17 may be mounted under and secured to the table 1 and may be supplied with air through the pedestal and through a suitable valve structure, (not shown but which may be similar to that shown in Figs. 7 and 8 hereinafter described), to admit and exhaust fluid pressure into or out of the opposite ends of the cylinders at appropriate times, to raise or lower the rack bars, and thus to invert or revert the blank molds.

The sections of each blank mold are mounted upon a pivot pin 9 which in turn is mounted in an arm 18 formed preferably integrally with the gear 15, and extending laterally from approximately the center thereof. The sections of the divided neck mold 19 also are pivotally mounted upon the pivot pin 9.

The blank mold and neck mold and the operating mechanism therefor are similar in construction to the blank mold, neck mold, and associated operating mechanisms disclosed in the British patent to Lynch Glass Machinery Co., No. 160,366 referred to in my copending application which discloses the subject matter of this application. Certain of the description herein of the blank mold, the neck mold, and associated mechanisms is taken in part from the description of similar apparatus shown in said patent, insofar as it is applicable to the construction of the present invention.

Pivotally connected to each of the arms 20 which carry the sections 21 of the blank mold 8 (Fig. 5) is a link 22, the two links of the mold being extended inwardly and attached to a clevis 23 (Figs. 5 and 6). This clevis is attached to the outer end of the rod 24 of a piston 25 mounted to reciprocate in the piston chamber 26. The chamber 26 is formed in the inner end of the stub-shaft 10 and the inner end of this chamber is closed by a head 27.

The blank mold is opened and closed at appropriate times by the alternate admission and exhaust of fluid pressure to and from the opposite ends of the chamber 26. To this end, a pair of downwardly extending ducts 28 and 29 (Fig. 6) are formed in the top of the hub 12. These ducts are adapted to be placed in communication with the inner and outer ends of the chamber 26 by the following means:

An annular groove 30 is formed in the bearing 11 and constantly communicates with the passage 28. A passage 31 extends longitudinally within the wall of the piston chamber 26 and connects the groove 30 with the inner end of the cylinder 26, where it opens through a port into the inner end of said chamber 26. A port 32 is formed in the outer end portion of the wall of chamber 26 and is adapted, when the blank mold is in neck-up position, to come into registry with the lower end of the passage 29 thus to direct fluid pressure from said passage against the outer face of the piston 25, or to exhaust fluid pressure from the outer end of said chamber.

Connected to the upper ends of the passages 28 and 29 respectively are parallel conduits 33 and 34 which extend across the cap portion of the hub 12, and thence downwardly along the periphery of said hub. At its lower end, conduit 33 is connected to a port 35 extending radially through the hub portion 12 of the table (Fig. 7).

Formed on the periphery of the upper portions of the pedestal 3, and in the same horizontal plane, are two grooves 36 and 37 with which the inner ends of the passages 35 successively register during the continuous rotation of the table (Figs. 6, 7, 7a and 7b). The groove 36 is so located that it will register with a passage 35, prior to the arrival of the corresponding blank mold at the charge receiving station, while the blank mold is at the charge receiving station, and for a period during the movement of the blank mold from the charge receiving station toward the transfer station. The groove 37 is adapted to be connected to the passage 35 after the blank mold has moved away from the charge receiving station, and approaches the transfer station. The passage 35 also remains in registry with the groove 37 during the movement of the blank mold toward and away from the transfer station.

The groove 36 is adapted to receive pressure through a vertical bore 38 in pedestal 3 (Figs. 7 and 7a), the bottom end of which bore is connected through a horizontal bore 39 to a conduit 40 connected to a suitable source of fluid pressure. Another vertical bore 41 (Figs. 7 and 7b) is adapted to exhaust pressure from the groove 37, the lower end of the vertical bore 41 being connected to a horizontal bore 42 which in turn is connected to an exhaust conduit 43 which leads to the atmosphere.

The lower end of conduit 34 is connected to a radial port 44 (Figs. 8 and 8b) formed in the hub 12 of the table and adapted to register successively with the grooves 45 and 46 formed on the periphery of the pedestal 3 and located in the same horizontal plane below the plane of grooves 36 and 37 (Figs. 6, 8, 8a and 8b). The arrangement of the grooves 45 and 46 is such that ports 44 will register successively with the said grooves simultaneously with the successive registry of the corresponding ports 35 with grooves 36 and 37. The groove 45 communicates with vertical bore 47 (Figs. 8 and 8a) formed in the pedestal 3, the lower end of the bore 47 connecting with a horizontal bore 48, which in turn is connected to an exhaust conduit 49 which leads to the atmosphere. The groove 46 likewise is in communication with a vertical bore 50 (Figs. 8 and 8b) formed in the pedestal, this vertical bore communicating at its lower end through a horizontal bore 51 with a conduit 52 which leads from a suitable source of fluid pressure.

When the blank mold moves through an angle defined by the opposite ends of groove 37, toward the position in which one of said molds is shown in Figs. 5 and 6 at, or toward and away from the transfer point, the pressure in the inner end of chamber 26 will be exhausted through passages 31, 30, 28, conduit 33, passage 35 through the groove 37, thence downwardly through the vertical bore 41 and through the conduit 43 to the atmosphere. At the same time, fluid pressure will be admitted into the outer end of the chamber 26 as follows: Through the conduit 52, upwardly through bore 50, into groove 46, thence through passage 44 into conduit 34, and through passage 29 and port 32 into said chamber. As a result, piston 25 will be moved to the left and the body parison mold will be opened and held open the desired period to effect the transfer of a blank from the blank mold to the finishing mold. The positions which the parts of the machine occupy during such admission and exhaust of fluid pressure, and at the time of transfer, are illustrated in all of the figures.

As the blank mold is moved toward the position in which one of said molds is shown inverted in Fig. 6, or toward and away from the charge receiving station, and through an angle defined approximately by the opposite ends of grooves 36 and 45, the ports 35 and 44 come into registry respectively with said grooves 36 and 45. As a result, fluid pressure will be admitted into the inner end of chamber 26 and will be simultaneously exhausted from the outer end of said cylinder in the following manner: Fluid pressure will flow through conduit 40, thence upwardly through the bore 38 into the groove 36, from the groove 36 through port 35 into conduit 33, thence through passages 28, 30, and 31 into the inner end of the chamber 26. At the same time, fluid pressure will be exhausted through port 32 and passage 29, (which are in registry at this time, because of the blank mold being in neck-up position during the first portion of its travel toward the charge receiving station), through conduit 34, groove 45, thence downwardly through the vertical bore 47, and outwardly to the atmosphere through exhaust conduit 48. Consequently, the body parison mold will be closed preparatory to receiving a charge of glass, and will be held closed for the desired period to permit a parison to be formed therein.

It will be observed that the construction of the blank molds and the operating mechanism associated therewith described above, are substantially the same as those described on page 3, lines 7 to 62, and page 4, lines 35 to 122 of the Lynch patent referred to above, except that the apparatus of Lynch is designed to operate intermittently and not continuously, as does that of my invention.

Pivotally mounted in one end portion of the pivot pin 9 are oppositely extending jaws 53 to the outer ends of which are attached segmental members 54 constituting the sections of the neck ring 19 (Figs. 3, 4 and 6). These sections are adapted to close together at the neck end of the blank mold and to this end the following mechanism is provided: Connected to the jaws 53 between their ends are links 55 and these links are in turn attached to a cross head 56 which has a guide pin 57 slidably mounted in an opening formed in the upstanding lug of a bracket 58 mounted on the gear 15, as shown in Figs. 4 and 6. A spring 58a is interposed between said lug and the cross head and encircles the guide pin 57, said spring serving to hold the neck ring closed. A lug 59 projects from the cross head 56 and extends downwardly when the mold is in inverted position, but projects upwardly when the mold is in neck-up position. When the lug and cross head are at their outermost positions, the links 55 press against the jaws 53 and hold the members of the neck ring closed together, but when the lug 59 and the cross head are drawn inwardly, the members of the neck ring are shifted away from each other.

Mounted on a bracket 59a carried by the hub 12 is a cylinder 60 containing a piston from which projects a stem 62. Connected to the outer end of this stem is a spool 63 and this spool is designed so that when the blank mold is in neck-up position, the lug 59 will enter the groove in the spool.

To open and close the neck ring, fluid pressure is alternately admitted to and exhausted from the inner and outer ends respectively of the cylinder 60 through ports or conduits 68 and 71, which conduits may communicate with suitable valve mechanism (not shown), such for instance as that shown in Figs. 7 and 8, whereby the neck ring may be opened and closed at the desired time in response to the rotation of the table.

The table 2 carries a series of divided blow molds 72, the sections of which are rotatably mounted on pivot pins 73, and which are opened and closed at the proper times by cam 74 and interconnected link mechanisms 75. Each blow mold has suitable blowing mechanism, indicated at 76, associated therewith for blowing the blanks or parisons to final shape. Such blowing mechanism per se, forms no part of the present invention and hence is not illustrated nor described in detail, the construction of mechanisms of this character being well known in the art.

In operation, the two mold tables rotate continuously. Each blank mold is first presented in an inverted position beneath the outlet of the feeding device 14 where it is supplied with a mold charge through its open bottom. As the mold moves along its circular path of travel, the charge is formed into a parison in the usual well-known manner. The mold may be inverted before the parison is completely formed, or may be reverted as the mold containing the finished parison is continued on to the transfer station, which is the point of tangency of the path of travel of the blank molds and blow molds. During this time an open blow mold is proceeding along a circular path of travel to the transfer station, the two molds reaching this point simultaneously. In approaching this station, the blank mold is opened soon enough to clear the blow mold, leaving the bare parison suspended from the neck ring. The blow mold is then closed about the parison during the continued travel of the mold, and the neck ring is opened to release the blank.

The speed of the tables 1 and 2 is such that there is sufficient time at the approximate point of coincidence of the paths of travel of the blank molds and blow molds for the transfer to be effected without interrupting the rotation of the table. The closing movement of the blow mold and the opening movement of the neck ring may continue for a slight distance beyond the exact point of tangency of the paths of travel of the molds, there being sufficient clearance to permit the parison to be transferred, notwithstanding the slight overlap in the several operations described.

The mechanism for supporting the charges and blowing the charges into parisons while in the blank mold do not constitue parts per se of the present invention and have been omitted in order to indicate more clearly the subject of the invention. Such mechanism may be of any well known type.

By means of the above described method and apparatus, the shaping instrumentalities alone effect the transfer of the parison, thereby avoiding injury to the blank which may result when the transfer is performed by extraneous means such as tongs and the like. Moreover, by disposing the mold tables on the same level, the transfer is accomplished with greater smoothness and avoids the complicated structure inherent in "double-deck machines".

The structure disclosed herein may be modified in construction, arrangement and mode of operation without departing from the scope of the invention, as set forth in the appended claim. For example, the tables may be spaced apart sufficiently to provide ample clearance for the parts, and in such event mechanism may be provided for moving the neck ring radially at the transfer zone, so as to position the parison in axial alignment with, and in the path of movement of, the blow mold, as shown in the patent to O'Neill, No. 1,462,652.

It is obvious that the novel transfer mechanism and method may be readily applied to a two table machine of the well known suction gathering type as is shown in the patent to Owens 1,245,262. It is not necessary that this be illustrated because the use of the Owens method and mechanism in a continuous two-table machine for forming the blanks is clearly disclosed in said Owens patent and in certain of my prior patents, as to each of which this application has a continuing relation. Said patents are as follows: Patent No. 1,833,302, granted November 24, 1931 on an application filed December 5, 1928; No. 1,764,805, granted June 17, 1930 on an application filed February 11, 1929; No. 1,823,123, granted September 15, 1931 on an application filed January 18, 1929; No. 1,891,896, granted December 20, 1932 on an application filed February 11, 1929; No. 1,871,556, granted August 16, 1932, filed February 6, 1929; and No. 1,944,866, granted January 23, 1934 on an application filed March 19, 1929.

Having thus described my invention, what I desire to claim and secure by Letters Patent is:

A glassware forming machine comprising a rotary blank mold carrier, a blank mold thereon, a neck mold associated with the blank mold, said blank mold being openable to leave the blank suspended from the neck mold, means for holding the neck mold above the blank mold when said blank mold is opening, a blow mold carrier, a blow mold on the blow mold carrier, automatic means for rotating said carriers in opposite directions including intermeshing horizontal gears mounted respectively on said carriers and means for driving said gears continuously, means supporting said carriers in such adjacent relation and for so holding the neck mold and blow mold on their respective carriers that the path of the blow mold cavity is substantially tangent to the path of the blank left suspended from the neck mold over the intermeshing portions of said gears, and means for directly transferring the blank from the neck mold to the blow mold during the rotation of said carriers, including automatic means for closing the blow mold about the blank while the blank is suspended from the neck mold.

KARL E. PEILER.